United States Patent [19]
Dartois

[11] 3,792,967
[45] Feb. 19, 1974

[54] SEALING ARRANGEMENT FOR APPARATUS FOR CONTINUOUSLY TREATING SOLID MATERIALS

[75] Inventor: Robert A. Dartois, Moustier-sur-Sambre, Belgium

[73] Assignee: Basse Sambre, Societe Anonyme, Etudes Recherches et Entreprises, Moustier-sur-Sambre, Belgium

[22] Filed: Jan. 31, 1973

[21] Appl. No.: 328,355

[30] Foreign Application Priority Data
Feb. 1, 1972 Belgium .............................. 113499

[52] U.S. Cl................. 432/244, 214/17 B, 34/242, 266/21, 432/121
[51] Int. Cl............................................. F27b 21/02
[58] Field of Search............ 432/237, 121, 240–244, 432/122, 134, 248, 137, 138; 198/41; 34/242; 266/21; 214/17 B

[56] References Cited
UNITED STATES PATENTS

| | | | |
|---|---|---|---|
| 2,789,809 | 4/1957 | Grabau et al. ........................ | 266/21 |
| 2,204,207 | 6/1940 | Coburn ................................. | 198/41 |
| 3,713,634 | 1/1973 | Moller et al. ......................... | 266/21 |
| 3,172,936 | 3/1965 | Koontz ................................. | 432/244 |

Primary Examiner—John J. Camby
Assistant Examiner—Henry C. Yuen
Attorney, Agent, or Firm—Eric H. Waters et al.

[57] ABSTRACT

An endless chain of carriages is continuously driven along top and bottom rails of a fixed frame. Solid material to be treated, is introduced into the carriages as they travel along the top rail together with a combustible substance. The carriages pass beneath burners where the combustible substance is ignited, and then the carriages pass over suction chambers where air is drawn through the carriages via a perforated bottom thereof to effect pronounced combustion of the combustible material and consequent treatment of the solid material, i.e., agglomeration of minerals. The carriages then pass onto the lower rail and the treated material is discharged. In order to provide a seal between the suction chambers and the carriages as the latter pass over the suction chambers, the carriages carry vertically slidable sealing members which fall by gravity onto fixed travel surfaces on the frame. In order to insure that the sealing members will drop onto the travel surfaces even if jammed by particles of material, electromagnets are placed beneath the travel surfaces at a location upstream of the suction chambers to attract the sealing members to lowered sealed position on the travel surfaces.

9 Claims, 3 Drawing Figures

SEALING ARRANGEMENT FOR APPARATUS FOR CONTINUOUSLY TREATING SOLID MATERIALS

BRIEF SUMMARY OF THE INVENTION

The invention relates to a sealing arrangement for installations for the continuous treatment of solid material in which a gas is subjected periodically to a suction. Sealing arrangements can be applied, in particular, to apparatus in which cooling, drying, pyrolizing or like operations are effected and specifically to apparatus for the agglomeration of minerals.

The apparatus generally comprises a succession of carriages connected to one another to form an endless chain of carriages which successively travel on upper and lower horizontal rails mounted on a fixed frame. The carriages travel on the upper rail in an upright position and on the lower rail in inverted position. These carriages include vessels with perforated bottoms, the material to be treated being placed in the vessels and in the case of agglomeration of minerals also including a combustible substance. After igniting the latter, the carriages pass over a plurality of suction chambers which cause passage of the air through the carriages from top to bottom for the purpose of supporting the agglomeration of the mineral under the effect of the released heat.

When a carriage passes above the suction chambers, it is necessary to provide a sealing relation between the carriage and the suction chambers. One such arrangement comprises sealing members mounted for free vertical sliding movement at opposite sides of the carriage and extending longitudinally along its entire length, said sealing members descending under the action of gravity to ride along a travel surface on the frame before the respective carriage reaches the suction chambers.

In practice, it has been found that the operation of the sealing members is often deficient because they become jammed in the recesses in which they are supposed to slide and thereby fail to descend to a lowered sealing position on the travel surface of the frame. The jamming of the sealing members is caused by the presence if powders and grains which become lodged between the walls of the recesses and the sealing members when the carriages are passing from the upper rail to the lower rail and the carriages become inverted and its contents are discharged, the sealing members at such time dropping by gravity to the bottom of the recesses. The jamming of the sealing members prevents their free vertical travel by gravity despite the weight of the sealing members and the shocks to which the carriages are subjected in the course of their travel. Consequently, the suction effect is uncertain and the reliability of the air drawn through the carriages is not obtained. It is estimated that approximately 12 percent of the volume of air can pass by an improperly operative sealing member thereby by-passing the vessels on the carriage carrying the minerals and combustible material. As a result, the output of the installation is reduced to 93 to 95 percent of its nominal production capacity.

An object of the invention is to provide a sealing arrangement which avoids the above deficiency and assures proper functioning of the sealing members when the carriages are above the suction chambers.

For this purpose, the frame carries, at a location upstream of the suction chambers, magnetic means for acting on the sealing members to cause the same to reach their lowered sealing positions when they have not done so under the action of gravity.

As suitable magnetic means, it is preferred to employ electromagnets capable of being energized when the sealing members have not reached a lowered operative position under the action of gravity, and remaining deenergized when the sealing members pass normally on their travel surface on the frame and provide a seal thereat. The electromagnets can be disposed under the travel surface of the sealing members, the material of the travel surface being composed of a non-magnetic material and the electromagnets include a core, with magnetic coils wound thereon, extending parallel to the travel surface on which the sealing members are to ride and pole pieces which are curved towards said travel surface.

Each sealing member extends along the entire length of its corresponding carriage and an assembly of a plurality of electromagnets can be disposed along the length of each sealing member. In such case, the adjoining pole pieces of adjacent electromagnets are of the same polarity. The entire assembly of electromagnets are capable of being energized when the sealing member is disposed thereabove. As a result, the sealing member is forceably lowered onto its travel surface and remains in contact therewith as the carriage continues its travel along the upper rail. The magnitude of the force utilized to lower the sealing member by the electromagnets is relatively small and insignificant as compared to the power used to advance the continuous chain of carriages and the electromagnets are energized only when the sealing members have not dropped to their operative positions.

DETAILED DESCRIPTION

Figure 1:
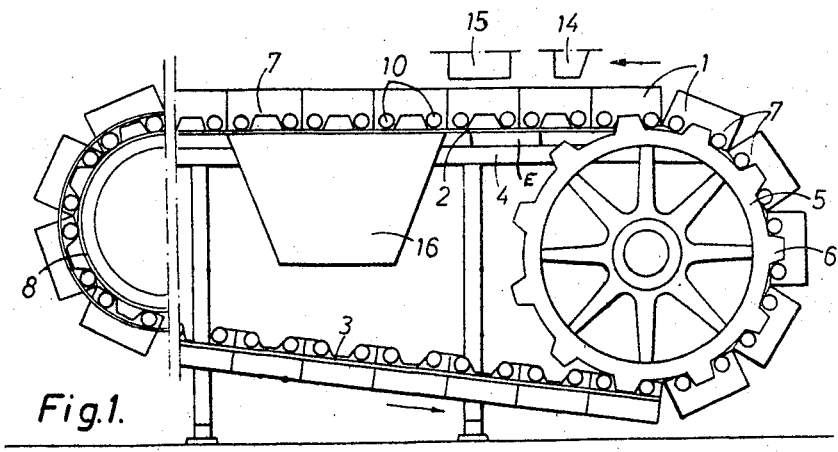
FIG. 1 is a diagrammatic side elevation view, broken in length, of an installation for the agglomeration of minerals.

Referring to the drawing, therein is shown an installation for the agglomeration of minerals comprising an endless chain of carriages 1 pivotably connected to one another and traveling along an upper surface 2 and a lower surface 3 of a fixed frame 4. The frame carriages at one of its ends, a pair of transversely spaced wheels 5 (only one of which is seen in FIG. 1) and each wheel has teeth 6 which engage in grooves provided in beams 7 secured to the lower ends of the carriages 1 on opposite sides thereof. The wheels 5 are driven in rotation by any suitable means (not shown) to advance the chain and cause the carriages 1 to pass on the lower surface 3 in a downwardly facing attitude and then on the upper surface 2 in an upwardly facing attitude. At the opposite end of the frame, there can be provided similar wheels, driven or not, or simply a curved guide 8, as shown, which connects the upper and lower surfaces 2 and 3. Fixedly secured to the beams 7 on the carriages are stub axles 9 on which are rotatably mounted rollers 10 which roll on rails 11 mounted on frame 4 (FIG. 2) thereby permitting travel of the carriages on the frame, a similar rail arrangement being provided on the frame 4 at the lower surface 3. The carriages comprise vessels having upstanding solid walls 12 and a perforated bottom 13.

The vessels are adapted to receive a mixture of a charge of minerals and a combustible product when the vessel passes beneath a hopper 14 when the carriages pass onto the beginning of the upper surface 2 of the frame 4 in the course of travel of the chain in the direction indicated by the arrows in FIG. 1. As the vessels continue to advance beyond hopper 14 they pass beneath a burner 15 which ignites the combustible product. As the carriages continue to advance along their path of travel, they pass above an assembly of suction chambers 16 which draws air under suction pressure into the vessels and through the perforated bottoms 13 thereof to maintain the combustion and cause agglomeration of the minerals under the effect of the high temperature and the carbon residues of combustion. When the vessels arrive at the curved guide 8, the contents of the vessels are deposited into a receiver (not shown) located below the guide 8.

In order to enable the combustion air to efficiently pass through the vessels under suction, it is necessary to provide a sealing relation between the vessels and the air chambers 16.

Figure 2:
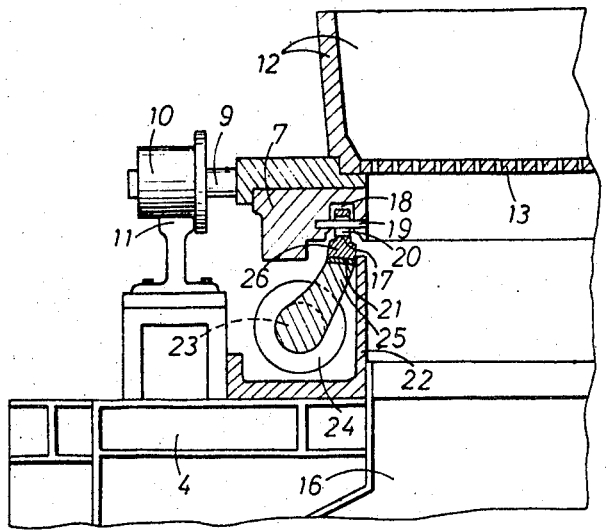
FIG. 2 is a transverse sectional view taken through the installation of FIG. 1 showing one side portion of a carriage thereof with its sealing member lowered onto its travel surface.
Figure 3:
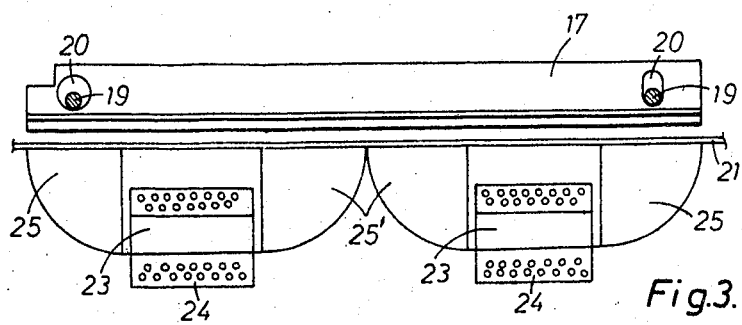
FIG. 3 is a schematic plan view, partly in section, showing an electromagnet assembly below one sealing member in a position not lowered onto the travel surface.

A suitable sealing means for this purpose comprises a sealing member 17 extending along the length of each carriage and loosely received in a recess 18 in the respective beam 7. Each sealing member extends partly in recess 18 and projects therefrom as seen in FIG. 2. Each sealing member 17 is supported at its ends on pivots 19 which are fixed in beam 7, the sealing member having enlarged holes 20 in which the pivots 19 are loosely received as seen in FIG. 3. The hole 20 at the left end of sealing member 17 in FIG. 3 is circular and the hole 20 at the right end, is vertically elongated in order that during the passage of the carriages from one surface to the other, the sealing member will be free to ride on the pivots under the action of gravity. During passage on the upper surface 2, the sealing members 17 of the carriages drop onto a plate 21 secured to a bracket 22 fixed on the frame 4 and remain in contact with this plate, while sliding thereon, as the carriages pass above the suction chambers 16. When the carriages travel along the lower surface 3 in inverted position, the sealing members drop to the bottom of the recesses 18 and remain in place thereat until the carriages travel on the wheels 5 to reach the upper surface of the frame.

The free movement of sealing members 17 is often blocked by the presence of powders and hard grains of material which become lodged between the sealing members and the walls of the recesses 18 so that the seal between the carriages and the frame is not completely attained.

The arrangement according to the invention provides for proper sealing in such circumstances and for this purpose there are provided magnetic means E preferably in the form of electromagnets disposed upstream of suction chambers 16 somewhere in the region of the hopper 14 or the burner 15. The electromagnets are mounted below plate 21 within brackets 22 and each electromagnet comprises a core 23 surrounded by a magnetic coil 24 and extending parallel to plate 21; and pole pieces 25 which are curved towards plate 21 as seen in FIG. 3. The plate 21 is made of a non-magnetic metal, for example, aluminum whereas the sealing member 17 is made of a magnetic metal which is attracted to the plate 21 when the electromagnet is energized. When a plurality of electromagnets are arranged along the length of each sealing member 17 as shown in FIG. 3, the adjacent pole pieces of successive electromagnets have the same polarity.

The coils 24 are adapted to be subjected to an electrical voltage, either continuously, or intermittently when a carriage arrives above the electromagnets and the sealing member has not dropped by gravity onto plate 21, and the coils are interrupted from voltage supply when the sealing member has dropped under the action of the electromagnet and is seated on plate 21 for normal travel thereon. As shown in FIG. 2, the sealing members 17 can be provided with an enlarged shoe portion 26 to correspond with the width of the pole pieces 25, 25' disposed beneath plate 21.

It is to be understood that the invention is not limited to the embodiment which has been disclosed solely by way of example, and variations can be made within the scope of the invention. For example, the electromagnets could be mounted cross-wise between the two travel surfaces of the sealing members of the carriage. Also, the number of electromagnets provided could be changed. Moreover, the electromagnets could be replaced by permanent magnets or magnets which are activated by other means than electrical current.

What is claimed is:

1. In an apparatus for the treatment of solid material in which a plurality of carriages are connected together in an endless chain and are driven in succession on top and bottom rails of a fixed frame to successively pass a filling station whereat the solid material is introduced into the carriages, a burner station, suction chambers to draw air through the carriages via a perforated bottom thereof, and a discharge station, the carriages including sealing members extending along their length and supported for free vertical movement to drop by gravity to a sealing position whereat the sealing members ride on a travel surface on the fixed frame and provide a seal between the carriages and the suction chambers, an improvement comprising magnetic means supported on said frame upstream of the suction chambers for applying an attractive force to the sealing members to forceably lower the same onto their travel surfaces in the event that the sealing members fail to drop by gravity onto said travel surfaces.

2. An improvement as claimed in claim 1 wherein said magnetic means comprises an electromagnet which can be energized to lower a sealing member when the latter is not in sealing position and which can remain deenergized when the sealing member has dropped to its sealing position.

3. An improvement as claimed in claim 2 wherein the material of the frame forming the travel surface for the sealing members is non-magnetic.

4. An improvement as claimed in claim 3 wherein said electromagnet comprises a core with coils wound thereon disposed beneath said travel surface and extending longitudinally thereof in parallel relation, and pole pieces coupled to the core and facing the travel surface from therebeneath.

5. An improvement as claimed in claim 4 wherein said pole pieces are curved towards said travel surface.

6. An improvement as claimed in claim 4 wherein said magnetic means comprises a plurality of said electromagnets arranged one behind another over a length corresponding to the length of a sealing member, the adjoining pole pieces of adjacent electromagnets having the same polarity.

7. An improvement as claimed in claim 4 wherein said sealing members include widened shoes at the lower ends thereof which ride on the travel surfaces, said pole pieces having a width corresponding to that of said shoes.

8. An improvement as claimed in claim 2 wherein said electromagnet is disposed in entirety beneath the travel surface.

9. An improvement as claimed in claim 8 wherein the electromagnet is deenergized at the moment when the sealing member starts to lower towards the travel surface.

* * * * *